(12) United States Patent
Yamada et al.

(10) Patent No.: US 9,387,740 B2
(45) Date of Patent: *Jul. 12, 2016

(54) REAR WHEEL SUSPENSION DEVICE (71) Applicant: HONDA MOTOR CO., LTD., Tokyo (JP)

(72) Inventors: Nobuhiro Yamada, Wako (JP); Yoshimitsu Akuta, Wako (JP); Akira Kanehara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,052

(22) Filed: Aug. 29, 2014

(65) Prior Publication Data

US 2015/0061251 A1 Mar. 5, 2015

(30) Foreign Application Priority Data

Aug. 30, 2013 (JP) ................................. 2013-179575

(51) Int. Cl.
*B60G 3/26* (2006.01)
*B62D 17/00* (2006.01)
*B60G 7/00* (2006.01)

(52) U.S. Cl.
CPC ...... *B60G 7/006* (2013.01); *B60G 3/26* (2013.01); *B62D 17/00* (2013.01); *B60G 2200/18* (2013.01); *B60G 2200/46* (2013.01); *B60G 2200/462* (2013.01)

(58) Field of Classification Search
CPC ...... B60G 3/26; B60G 7/006; B60G 2200/46; B60G 2200/462; B62D 17/00
USPC ............... 280/5.521, 5.522, 86.751, 86.757, 280/86.758, 93.512
See application file for complete search history.

(56) References Cited

U.S. PATENT DOCUMENTS

| 4,709,935 | A | * | 12/1987 | Takizawa et al. | ............. 180/414 |
| 5,026,091 | A | * | 6/1991 | Lee | .......................... B41J 32/00 |
| | | | | | 280/124.106 |
| 5,071,156 | A | * | 12/1991 | Kanai et al. | ............. 280/124.143 |
| 6,279,920 | B1 | * | 8/2001 | Choudhery | ................ 280/5.521 |

(Continued)

FOREIGN PATENT DOCUMENTS

| JP | 2011-116164 A | 6/2011 |
| JP | 2012-076500 A | 4/2012 |
| JP | 2012-116251 A | 6/2012 |

OTHER PUBLICATIONS

Office Action dated Dec. 5, 2014 issued in U.S. Appl. No. 14/472,691.

*Primary Examiner* — Drew Brown
(74) *Attorney, Agent, or Firm* — Westerman, Hattori, Daniels & Adrian, LLP (57) ABSTRACT

A rear wheel suspension device includes a knuckle configured to support a rear wheel, a trailing arm and upper arm and lower arm configured to link the knuckle to a vehicle body, and an actuator configured to drive the knuckle in the general width direction of the vehicle, so as to adjust the rear wheel camber angle and toe angle. The knuckle is linked to the suspension arms via linking portion enabling turning of the knuckle in a direction of changing the rear wheel camber angle and toe angle. A turning axis defined by the linking portion is tilted with respect to longitudinal direction of the vehicle such that the front portion thereof in the longitudinal direction of the vehicle is tilted outward in plan view, and is tilted upward in side view.

7 Claims, 12 Drawing Sheets

(56) References Cited

U.S. PATENT DOCUMENTS

| | | | |
|---|---|---|---|
| 6,347,802 B1* | 2/2002 | Mackle et al. | 280/5.521 |
| 6,637,758 B2* | 10/2003 | Woo | B60G 3/26 |
| | | | 280/5.521 |
| 6,676,145 B2* | 1/2004 | Carlstedt et al. | 280/124.146 |
| 7,766,345 B2 | 8/2010 | Hakui et al. | |
| 7,896,360 B2* | 3/2011 | Buma | B60G 17/0161 |
| | | | 280/5.502 |
| 9,061,559 B2* | 6/2015 | Yamada | B60G 3/26 |
| 2003/0011157 A1* | 1/2003 | Aubarede et al. | 280/86.751 |
| 2003/0209866 A1* | 11/2003 | Kwon | 280/5.522 |
| 2006/0027986 A1* | 2/2006 | Ziech | 280/93.512 |
| 2007/0001420 A1* | 1/2007 | Schmidt et al. | 280/124.134 |
| 2007/0290473 A1* | 12/2007 | Buma | B60G 3/202 |
| | | | 280/124.106 |
| 2010/0289229 A1* | 11/2010 | Post et al. | 280/5.524 |
| 2010/0320706 A1 | 12/2010 | Horiguchi et al. | |

* cited by examiner

OUTER WHEEL OF TURN
NEGATIVE CAMBER
TOE-OUT

INNER WHEEL OF TURN
POSITIVE CAMBER
TOE-IN

FIG. 8C

INNER WHEEL OF TURN
POSITIVE CAMBER
TOE-IN

OUTER WHEEL OF TURN
NEGATIVE CAMBER
TOE-OUT

REAR WHEEL SUSPENSION DEVICE

CROSS REFERENCES TO RELATED APPLICATIONS

The present application claims priority under 35 U.S.C. §119 to Japanese Patent Application No. 2013-179575, filed Aug. 30, 2013, entitled "Rear Wheel Suspension Device." The contents of this application are incorporated herein by reference in their entirety.

TECHNICAL FIELD

The present disclosure relates to a rear wheel suspension device which adjust the camber angle and toe angle of rear wheels by pushing and pulling knuckles using an actuator.

BACKGROUND

Using a rear wheel suspension device of an automobile to perform inverse phase toe angle control, where the rear wheels are given toe angle of the opposite phase as the steering angle yields advantages such as improved steering properties during low-speed turning, and improved drivability due to an improved vehicle attitude angle. Also, a configuration which enables the camber angle of the rear wheels to be changed is advantageous in that the running resistance is reduced as rolling resistance is reduced due to reduction in ground contact area.

Related art regarding such rear-wheel camber angle and toe angle includes using a strut-type rear wheel suspension device originally configured to include struts made up of dampers and springs, and lower arms, to adjust the camber angle of the rear wheels by driving the knuckles by pushing and pulling with motors so as to turn the knuckles on the camber shafts. The lower ends of the knuckles are also linked to the lower arms by ball joints, thereby enabling the toe angle of the rear wheels to be adjusted (see Japanese Unexamined Patent Application Publication No. 2011-116164).

However, the above related art uses motors which serve as actuators to adjust only the camber angle of the rear wheels, thus separate actuators have to be provided if the toe angle of the rear wheels is also to be adjusted. This configuration would be problematic in that unstrung weight increases, and so forth.

Also, inverse phase toe angle control, where the rear wheels are given toe angle of the opposite phase to the steering angle of the front wheels, yields advantages such as improved steering properties during low-speed turning and improved drivability. However, applying inverse phase toe angle control based on such low-speed turning to high-speed turning as well causes a problem of poorer stability due to the inverse phase toe angle. Accordingly, it would be difficult to realize desirable performance for both low-speed turning and high-speed turning.

One solution would be controlling the rear wheel toe angle in accordance with the vehicle speed. On the other hand, applying toe angles of opposite directions and of different absolute values to the left and right rear wheels results in the toe angle substantially changing in accordance with the lateral acceleration placed on the vehicle when turning, thus a state is realized where a suitable toe angle according to vehicle speed is given, even without controlling the toe angle in accordance with the vehicle speed. Therefore, steering properties during low-speed turning and drivability can be improved while preventing deterioration in stability during high-speed turning.

SUMMARY

It would be desirable to provide a rear wheel suspension device configured so as to be able to adjust the camber angle and toe angle of the rear wheels with a single actuator at the same time, and further to be able to apply toe angles of opposite directions and of different absolute values to the left and right rear wheels.

According to a first aspect of the present disclosure, rear wheel suspension device includes a knuckle (4) configured to support a rear wheel (3), suspension arms (5, 6, 7) configured to link the knuckle to a vehicle body, and an actuator (10) configured to drive the knuckle in the general width direction of the vehicle, so as to adjust the rear wheel camber angle and toe angle. The knuckle is linked to the suspension arms (5) via linking portions (11, 12) enabling turning of the knuckle in a direction of changing the rear wheel camber angle and toe angle. A turning axis (A) defined by the linking portions is set so that the front portion in the longitudinal direction of the vehicle is tilted outwards in plan view, and is tilted upwards in side view.

This configuration enables the camber angle and toe angle to be adjusted at the same time with a single actuator. If the actuator is driven to push the knuckles in the opposite direction with the same stroke amount, the absolute value of toe angle at the toe-out side is smaller than the absolute value of toe angle at the toe-in side. Accordingly, when performing inverse phase toe angle control where the rear wheels are given toe angle of the opposite phase to the steering angle of the front wheels, the substantive toe angle becomes smaller when turning at higher speeds and the substantive toe angle becomes greater when turning at lower speeds, even without performing control to change the toe angle based on the vehicle speed. Accordingly, steering properties during low-speed turning and drivability can be improved while preventing deterioration in stability during high-speed turning. Also, if the actuator is driven to push or pull the knuckles in the opposite direction with the same stroke amount, the absolute values of toe angles differ between the toe-out side and toe-in side, but the absolute values of camber angle can be made to be substantially equal. Accordingly, camber angle with substantially equal absolute values can be applied to the left and right rear wheels when performing inverse phase toe angle control, thus running resistance when turning can be reduced in a well-balanced manner between the left and right sides.

The turning axis may be set so that the front portion in the longitudinal direction of the vehicle is tilted upwards in side view.

According to this configuration, when performing inverse phase toe angle control, negative camber can be applied to the wheel on the outside of the turn (toeing out), and positive camber can be applied to the wheel on the inside of the turn (toeing in), thereby enabling turning performance to be improved.

A single actuator (10) may be provided having two output shafts (19) which push and pull two of the knuckles (4) each supporting the respective left and right rear wheels (3).

According to this configuration, only one actuator is needed, thus manufacturing costs can be reduced.

The suspension arms provided may include a trailing arm (5), upper arm (6), and lower arm (7), in which the knuckle (4) is linked to the trailing arm by the linking portions (11, 12) defining the turning axis (A).

According to this configuration, the knuckle can be linked to the trailing arm with high rigidity, so the camber angle and toe angle of the rear wheel can be adjusted with a high degree of precision. In the above explanation, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

FIGS. 10A1 through 10C4 are schematic side views and plan views of rear wheel camber angle and toe angle in modifications where a turning axis has been set variously.

FIGS. 11A1 through 11C4 are schematic side views and plan views of rear wheel camber angle and toe angle in modifications where a turning axis has been set variously.

FIGS. 12A1 through 12C4 are schematic side views and plan views of rear wheel camber angle and toe angle in modifications where a turning axis has been set variously.

DETAILED DESCRIPTION

Figure 1:
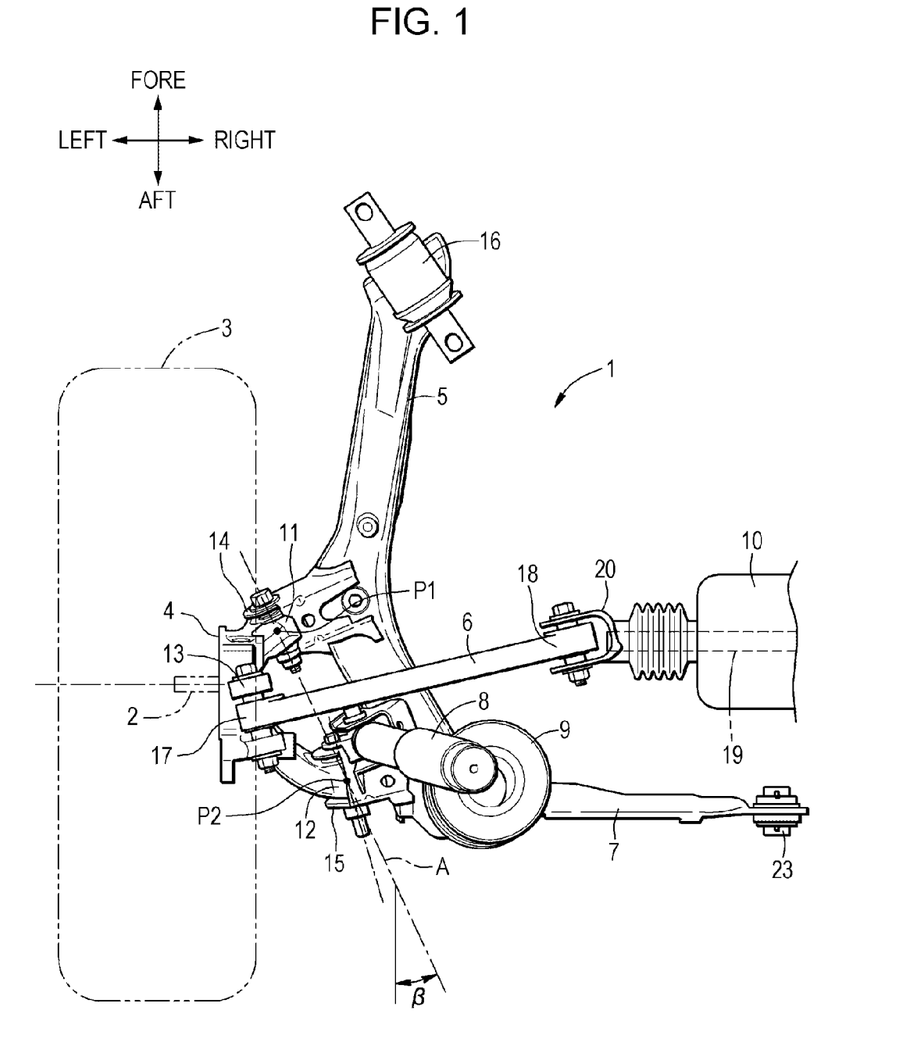
FIG. 1 is a plan view illustrating a rear wheel suspension device according to an embodiment.
Figure 2:
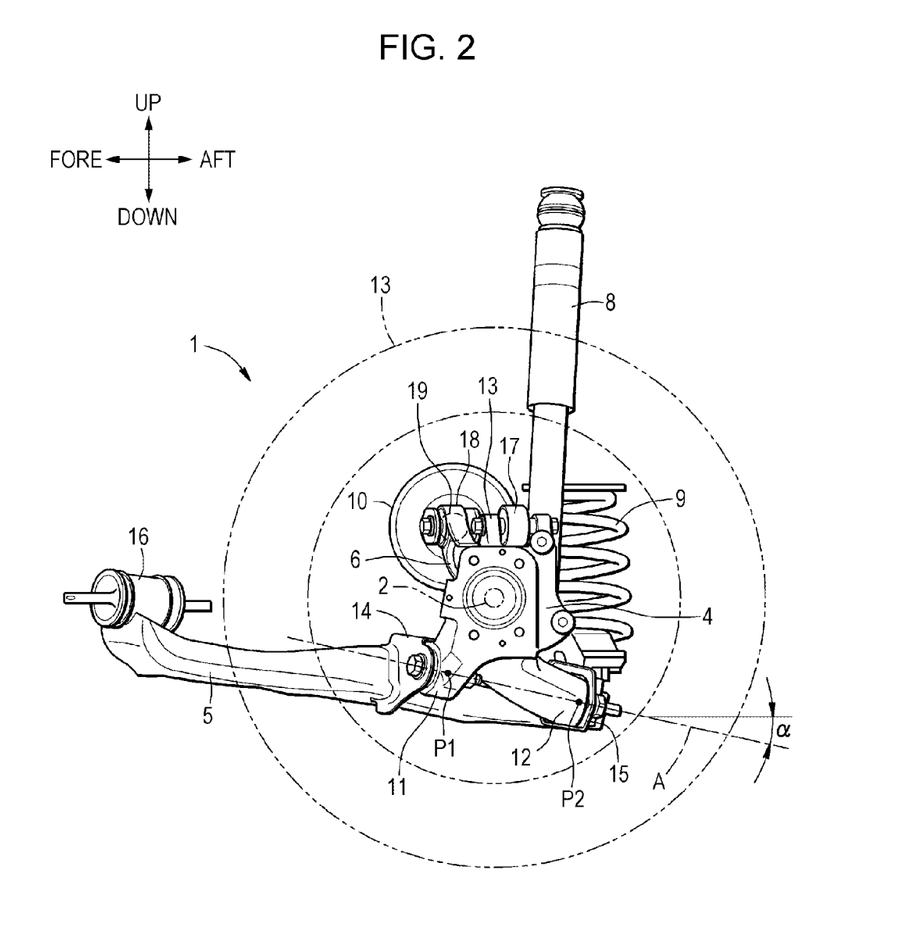
FIG. 2 is a side view of the rear wheel suspension device.
Figure 3:
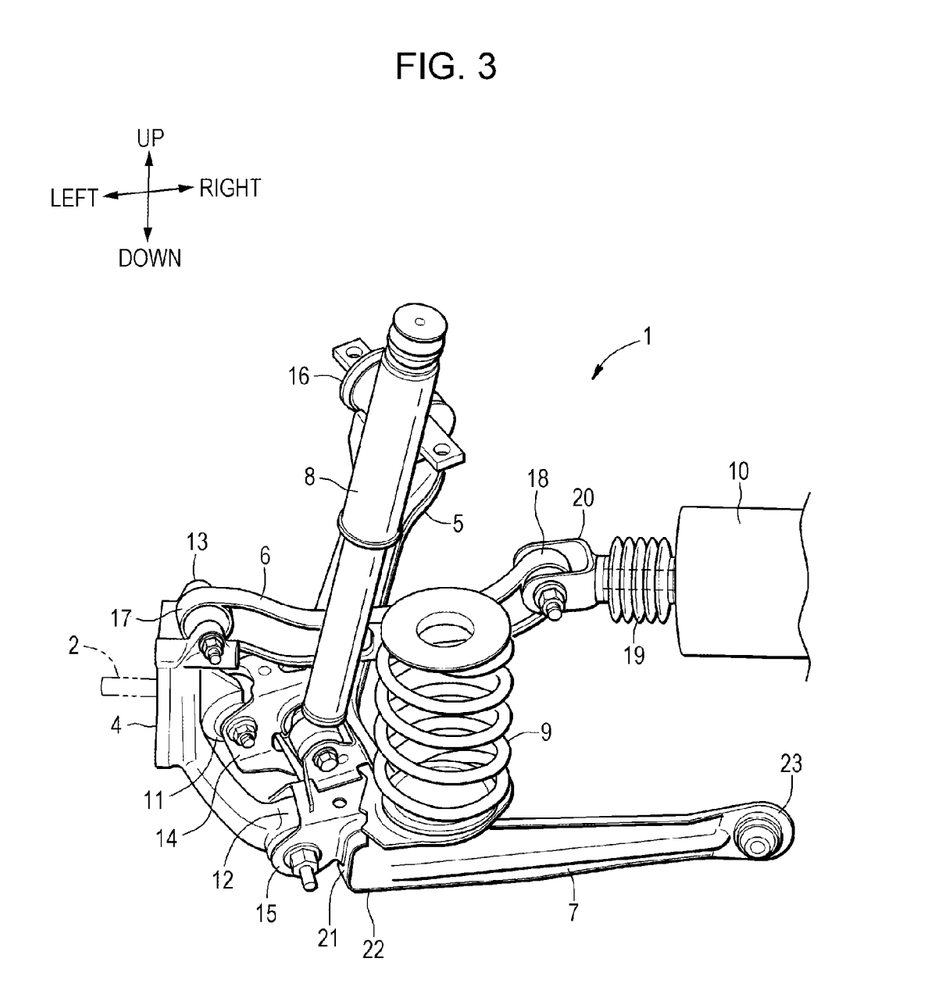
FIG. 3 is a perspective view of the rear wheel suspension device.

An embodiment of the present disclosure will be described with reference to the drawings. FIG. 1 is a plan view illustrating a rear wheel suspension device 1 according to an embodiment. FIG. 2 is a side view of the rear wheel suspension device illustrated in FIG. 1. FIG. 3 is a side view of the rear wheel suspension device illustrated in FIG. 1. While FIGS. 1 through 3 illustrate a rear wheel suspension device 1 for the left side of a vehicle, a rear wheel suspension device 1 for the right side of the vehicle is horizontally symmetrical with this.

As illustrated in FIG. 1, the rear wheel suspension device 1 includes a knuckle 4 which rotatably supports a rear wheel 3 by way of an axle 2, a trailing arm 5 which links the knuckle 4 to the body, and upper arm 6 and lower arm 7, a damper 8 and spring 9 which impart the trailing arm 5 with damping force and elastic force respectively, and an actuator 10 which performs pushing and pulling driving of the knuckle 4 generally in the width direction of the vehicle, to adjust the camber angle and toe angle of the rear wheel 3.

The knuckle 4 includes two link portions 11 and 12 to the trailing arm 5. The link portions 11 and 12 are turnably linked to link portions 14 and 15 provided on the trailing arm 5, respectively. Rubber bushes (elastic linking members) are each provided between the link portions 11 and 12 on the knuckle 4 side and the link portions 14 and 15 on the trailing arm 5 side.

The trailing arm 5 is formed having a dogleg shape in plan view, with the front link portion 14 provided at the bent portion thereof, and the rear link portion 15 provided at the rear end thereof. A link portion 16 is provided at the front end of the trailing arm 5, and is turnably linked to the body. A rubber bush (elastic linking member) is provided to the link portion 16.

The knuckle 4 also has a link portion 13 as to the upper arm 6. The link portion 13 is turnable linked to a link portion 17 provided on the outer end of the upper arm 6. A rubber bush (elastic linking member) is provided between the link portion 13 on the knuckle 4 and the link portion 17 on the upper arm 6.

A link portion 18 for the actuator 10 is provided on the inner edge of the upper arm 6. This link portion 18 is turnably linked to a link portion 20 provided on an output shaft 19 of the actuator 10. The actuator 10 is a linear actuator where the output shaft 19 advances and retreats in the axial direction (in the width direction of the body). The knuckle 4 is driven so as to be pushed and pulled via the upper arm 6 by advancing and retreating this output shaft 19.

As illustrated in FIG. 2, the link portions 11 and 12 on the knuckle 4 linking to the trailing arm 5 are situated below the axle 2, while the link portion 13 linking to the upper arm 6 is situated above the axle 2.

As illustrated in FIG. 3, a linking portion 22 linking to a rear end 21 of the trailing arm 5 is provided on the outer edge of the lower arm 7. A linking portion 23 turnably linked to the body is provided on the inner end of the lower arm 7. A rubber bush (elastic linking member) is provided to the linking portion 23.

Figure 4:
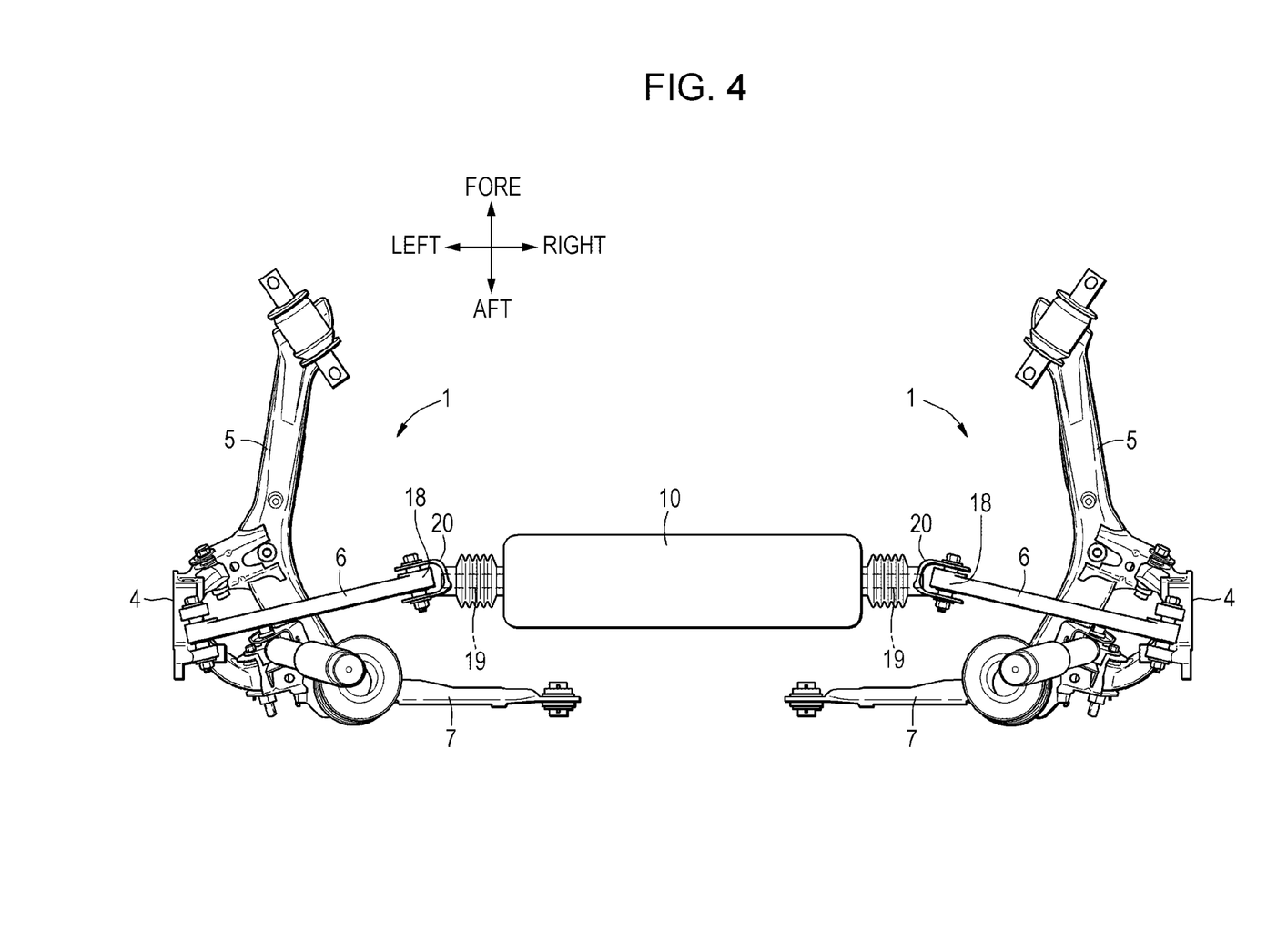
FIG. 4 is a plan view of right and left suspension devices.

FIG. 4 is a plan view illustrating left and right rear wheel suspension devices 1. The actuator 10 is situated at the middle of the vehicle in the horizontal direction. The actuator 10 includes output shafts 19 on both left and right sides. The output shafts 19 are connected to respective left and right upper arms 6. The left and right knuckles 4 are pushed and pulled by the actuator 10 via the left and right upper arms 6. The left and right output shafts 19 operate symmetrically, which is to say in opposite directions by the same stroke amount.

The present embodiment is arranged such that the knuckles 4 turn relative to the trailing arms 5 in a direction to change the camber angle and toe angle of the rear wheels, by the actuator 10 pushing or pulling the knuckles 4 via the upper arms 6. Hereinafter, the operation of the knuckles 4 turning relative to the trailing arms 5 in accordance with pushing and pulling by the actuator 10 will be described.

Figure 5A:
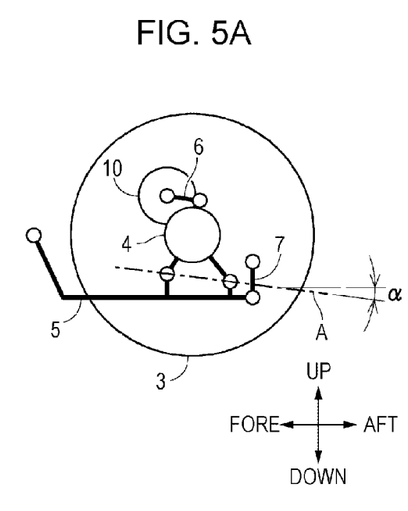
FIGS. 5A through 5D are side views and plan views of the rear wheel suspension device.
Figure 5B:
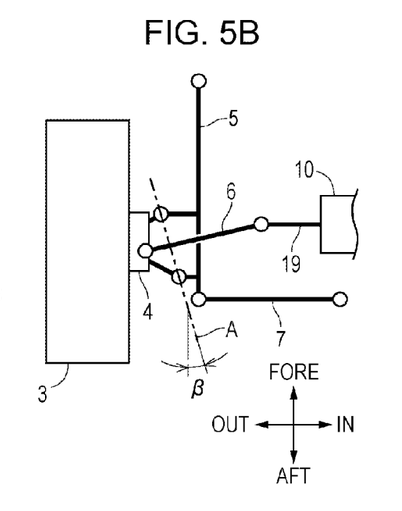
Figure 5C:
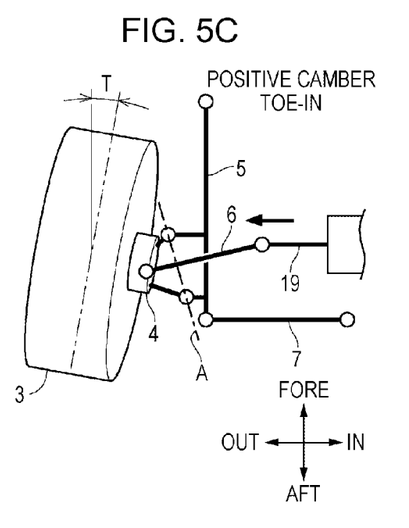
Figure 5D:
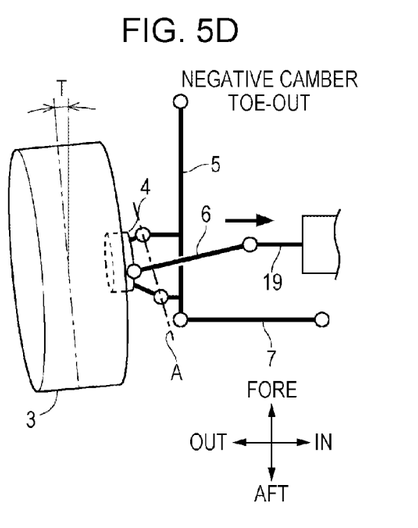

FIGS. 5A through 5D are schematic side views and plan views of the rear wheel suspension device 1, in which FIG. 5A is a side view, FIG. 5B is a plan view of a neutral position, FIG. 5C is a plan view illustrating the actuator 10 performing a pushing operation, and FIG. 5D is a plan view illustrating the actuator 10 performing a pulling operation.

As illustrated in FIGS. 1 and 2, the two link portions 11 and 12 provided to the knuckle 4 are distanced one from another in the longitudinal direction of the body and the width direction of the body, so that the knuckle 4 turns with respect to the trailing arm 5, on a turning axis A connecting center points P1 and P2 of the link portions 11 and 12 respectively. The center points P1 and P2 of the link portions 11 and 12 may be the center points of rubber bushes provided to the link portions 11 and 12.

Note that as illustrated in FIG. 2, the link portions 11 and 12 provided on the knuckle 4 to link to the trailing arm 5 are situated below the axle 2, and the link portion 13 to link to the upper arm 6 is provided above the axle 2. Accordingly, when the knuckle 4 turns on the turning axis A by being pushed or pulled by way of the upper arm 6, positive camber is provided to the rear wheel 3 when the actuator 10 pushes, and negative camber is provided to the rear wheel 3 when the actuator 10 pulls.

As illustrated in FIGS. 2 and 5A, the turning axis A is tilted up or down with respect to the longitudinal direction of the body in side view. Particularly, in the present embodiment, the turning axis A is tilted with respect to the longitudinal direction (longitudinal axis) of the vehicle by an angle α such that the front portion of the turning axis A is higher in side view. Also, as illustrated in FIGS. 1 and 5B, the turning axis A is tilted right or left with respect to the longitudinal direction of the body in plan view. Particularly, in the present embodiment, the turning axis A is tilted with respect to the longitudinal direction of the vehicle by an angle β such that the front portion of the turning axis A is outwards in plan view.

Accordingly, when the actuator 10 is pushing, as illustrated in FIG. 5C, the rear wheel 3 is imparted with positive camber and toe-in, and when the actuator 10 is pulling, as illustrated in FIG. 5D, the rear wheel 3 is imparted with negative camber and toe-out. Thus, the camber angle can be changed between positive and negative, and at the same time the toe angle can be changed between toe-in and toe-out, in accordance with the direction in which the actuator 10 operates. Also, the absolute value T of the toe angle at the toe-out side can be made to be smaller than the absolute value T of the toe angle at the toe-in side, even though the amount of stroke of the actuator 10 is the same.

Figure 6A:
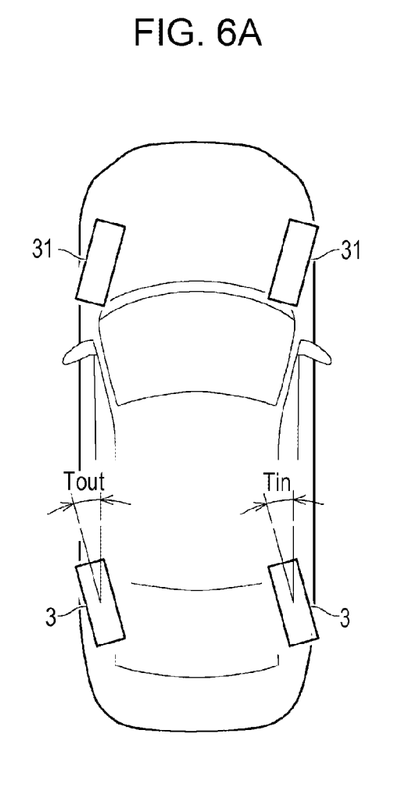
FIGS. 6A and 6B are schematic plan views illustrating the state of front wheels and rear wheels when the vehicle is turning.
Figure 6B:
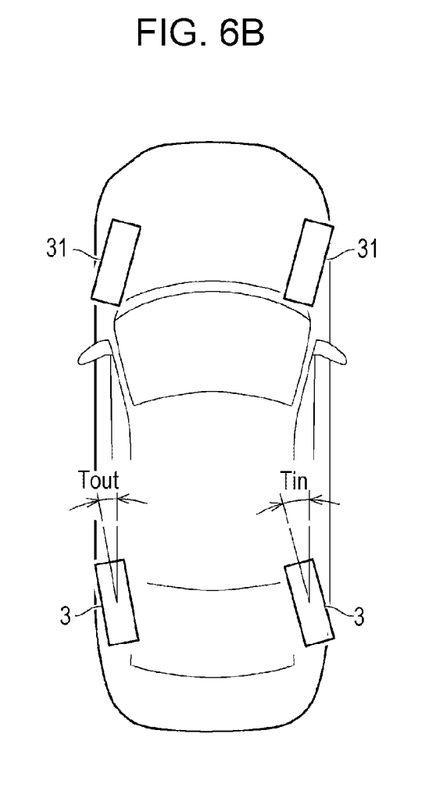
Figure 7:
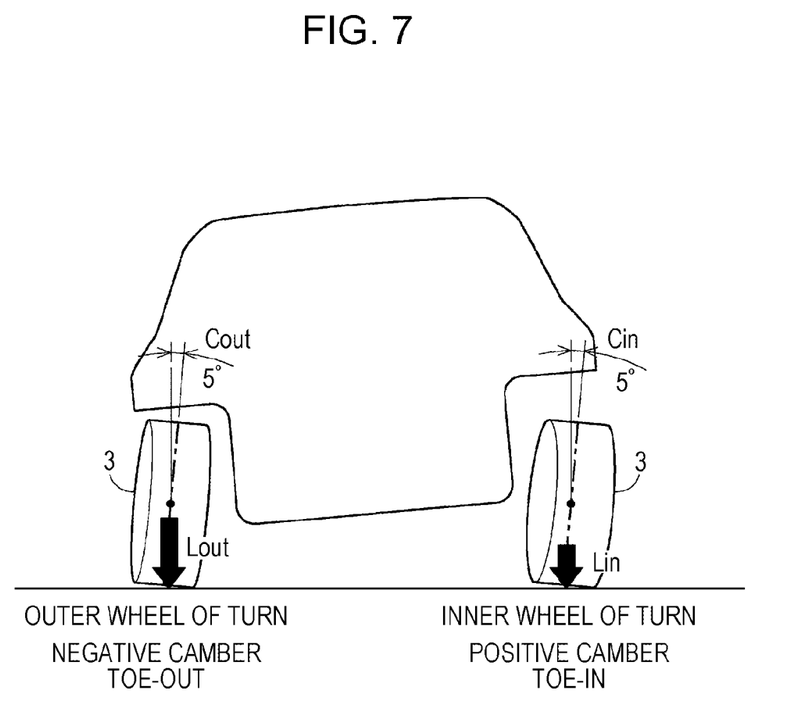
FIG. 7 is a schematic rear view illustrating the state of the rear wheels when the vehicle is turning.

Next, control when the vehicle turns will be described. FIGS. 6A and 6B are schematic plan views illustrating the state of front wheels 31 and rear wheels 3 when the vehicle is turning, in which FIG. 6A illustrates a comparative example and FIG. 6B illustrates the present embodiment. FIG. 7 is a schematic rear view illustrating the state of the rear wheels 3 when the vehicle is turning. While FIG. 6A through 7 illustrate a state in which the vehicle is tuning to the right, a state in which the vehicle is tuning to the left would be these drawings symmetrically inverted in the horizontal direction.

In order to improve steering properties during low-speed turning and improve drivability due to an improved vehicle attitude angle, in the present embodiment the rear wheels 3 are given toe angle of the opposite phase to the steering angle of the front wheels 31, as illustrated in FIGS. 6A and 6B. Accordingly, when turning to the right, for example, the rear wheel 3 on the outside of the turn is toed out while the rear wheel 3 on the inside of the turn is toed in.

In the example illustrated in FIG. 6A, the absolute value Tout of toe angle at the wheel on the outside of the turn and the absolute value Tin of toe angle at the wheel on the inside of the turn are generally the same. Conversely, according to the present embodiment as illustrated in FIG. 6B, the absolute value Tout of toe angle at the wheel on the outside of the turn is set so as to be smaller than the absolute value Tin of toe angle at the wheel on the inside of the turn. Also, according to the present embodiment as illustrated in FIG. 7, the absolute value Cout of camber angle at the wheel on the outside of the turn and the absolute value Cin of camber angle at the wheel on the inside of the turn are generally the same.

Now, performing inverse phase toe angle control where the rear wheels 3 are given toe angle of the opposite phase to the steering angle of the front wheels 31, regardless of the vehicle speed, will improve steering properties and stability during low-speed turning, but inverse phase toe angle will actually deteriorate stability during high-speed turning.

On the other hand, lateral acceleration occurring at the vehicle when turning causes load shift between the outer wheel on the outside of the turn and the inner wheel on the inside of the turn, such that the ground contact load Lout at the outer wheel on the outside of the turn increases and the ground contact load Lin at the inner wheel on the inside of the turn decreases as shown in FIG. 7. This load shift is marked in cases where great lateral acceleration occurs at the body, such as when turning at high speed. Accordingly, when the ground contact load Lout at the outer wheel on the outside of the turn is sufficiently greater than the ground contact load Lin at the inner wheel on the inside of the turn, the effect of the toe angle at the outer wheel on the outside of the turn becomes dominant, and the effect of the toe angle at the inner wheel on the inside of the turn is less consequential.

Accordingly, imparting the right and left rear wheels 3 with toe angles of different absolute values as according to the present embodiment illustrated in FIG. 6B enables the substantive toe angle of the right and left rear wheels 3 to be changed in accordance with the magnitude of lateral acceleration when turning. That is to say, if we think as the right and left rear wheels 3 as an equivalent single wheel, changing the absolute value of toe tangles between the right and left rear wheels 3 allows the toe angle applied to this equivalent one wheel to be changed in accordance with the magnitude of lateral acceleration.

Figure 8A:
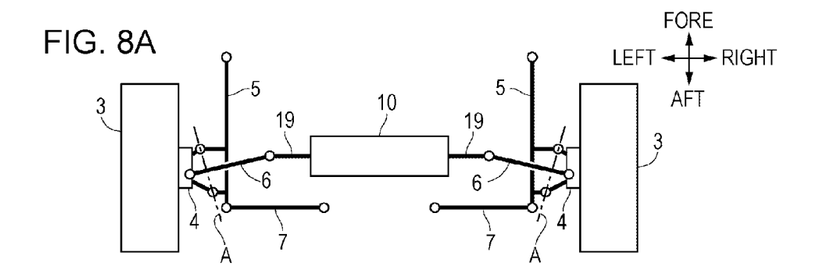
FIGS. 8A through 8C are schematic plan views illustrating the state of camber angle and toe angle of the rear wheels when the vehicle is turning.
Figure 8B:
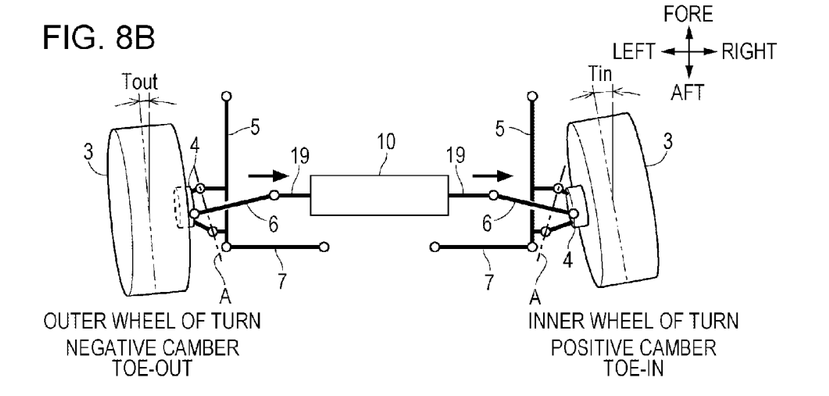
Figure 8C:
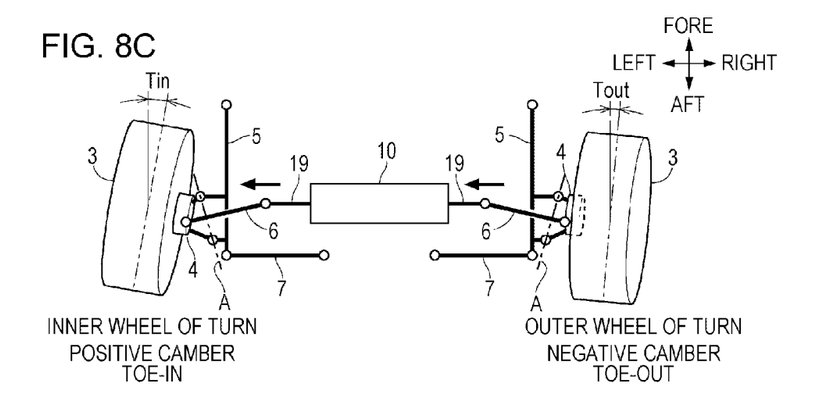
Figure 9A:
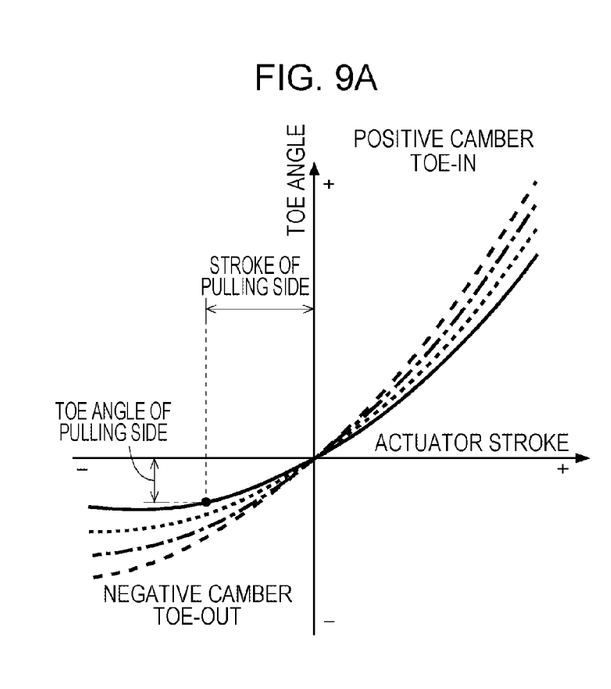
FIGS. 9A and 9B are graphs illustrating the relation between the stroke amount of an actuator and toe angle of the rear wheels.
Figure 9B:
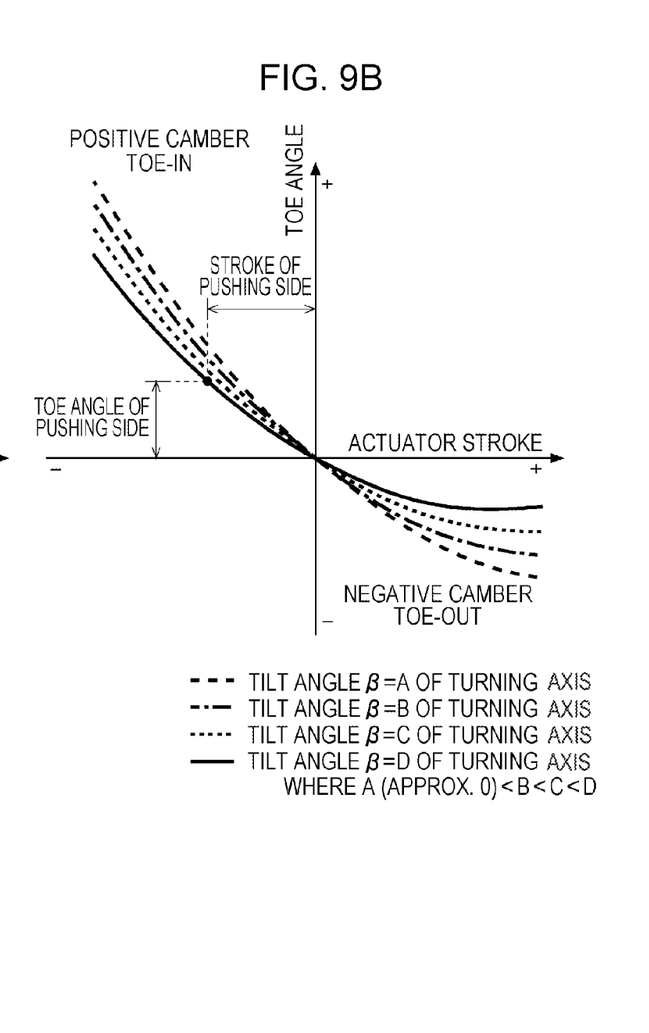

FIGS. 8A through 8C are schematic plan views illustrating the state of camber angle and toe angle of the rear wheels 3 when the vehicle is turning, in which FIG. 8A illustrates a state of the vehicle traveling straight, FIG. 8B illustrates a state of the vehicle turning to the right, and FIG. 8C illustrates a state of the vehicle turning to the left. FIGS. 9A and 9B are graphs illustrating the relation between the stroke amount of the actuator 10 and toe angle of the rear wheels 3, in which FIG. 9A illustrates the left rear wheel 3 and FIG. 9B illustrates the right rear wheel 3.

As described above, according to the present embodiment, positive camber and toe-in is applied to the rear wheel 3 when the actuator 10 is pushing and negative camber and toe-out is applied to the rear wheel 3 when the actuator 10 is pulling. If the actuator 10 pushes or pulls the left and right knuckles 4 in opposite directions with the same stroke amount, the state of turning will be as follows.

As illustrated in FIG. 8B, when turning to the right, the actuator 10 is operated so that the left and right output shafts 19 both move to the right direction from the neutral position illustrated in FIG. 8A, effecting a pushing operation at the right knuckle 4 and a pulling operation at the left knuckle 4. Thus, negative camber and toe-out are imparted to the left rear wheel 3 (the wheel on the outside of the turn), and positive camber and toe-in are imparted to the right rear wheel 3 (the wheel on the inside of the turn).

As illustrated in FIG. 8C, when turning to the left, the actuator 10 is operated the opposite to that illustrated in FIG. 8B, so that the state of the camber angle and toe angle of the left and right rear wheels 3 is the opposite to that illustrated in FIG. 8B.

Also, in the present embodiment, in a case of pushing or pilling the left and right knuckles 4 in the opposite directions by the actuator 10 with the same stroke, the absolute value of toe angle applied to the rear wheels 3 is different depending on whether a pushing operation or pulling operation. Particularly, the absolute value of toe angle of the pulling operation side (toe-out side) is smaller than the absolute value of toe angle of the pushing operation side (toe-in side) in the present embodiment.

Now, as illustrated in FIG. 9, a property curve representing the state of change in toe angle in accordance with the amount of stroke of the actuator 10 is close to linear at the toe-in region (region where toe angle is positive), but has a great curvature at the toe-out region (region where toe angle is negative). Accordingly, the absolute value of toe angle increases as the amount of stroke of the actuator 10 increases in the toe-in area, but the amount of change in toe angle in accordance with the stroke amount is smaller in the toe-out region as compared with in the toe-in region.

On the other hand, in the present embodiment, the left and right knuckles 4 are pushed and pulled by a single actuator 10, so that the left and right knuckles 4 are pushed and pulled in opposite directions with the same stroke amount, the pulling operation side being a toe-out region and the pushing operation side being a toe-in region. The stroke amount at the pulling operation side and stroke amount at the pushing operation side are the same, thus the absolute value of the toe angle at the pulling operation side is smaller than the absolute value of the toe angle at the at the pushing operation side. Accordingly, the absolute value Tout of toe angle at the wheel on the outside of the turn, which is the pulling operation side, is smaller than the absolute value Tin of toe angle at the wheel on the inside of the turn, which is the pushing operation side, as illustrated in FIGS. 8B and 8C.

Also, FIGS. 9A and 9B illustrate that when the tilt angle β of the turning axis A with respect to the longitudinal direction of the vehicle in plan view is great, the inclination of the property curve in the toe-out region is markedly small. Accordingly, when the tilt angle β of the turning axis A is great, the difference between the absolute value of toe angle in the toe-out region and the absolute value of toe angle in the toe-in region increases. Accordingly, toe angles with sufficiently great difference in absolute values can be imparted to the left and right rear wheels 3 by setting the tilt angle β of the turning axis A to be sufficiently great.

Thus, according to the present embodiment, toe angles with difference in absolute values can be imparted to the left and right rear wheels 3 in opposite directions, so as illustrated in FIGS. 8B and 8C, toe angle smaller than that of the wheel on the inner side of the turn is applied to the rear wheel 3 on the outer side of the turn, in the toe-out direction, and toe angle greater than that of the wheel on the outer side of the turn is applied to the rear wheel 3 on the inner side of the turn, in the toe-in direction. Further, negative camber of generally the same magnitude of that of the wheel on the inner side of the turn is applied to the rear wheel 3 on the outer side of the turn, and positive camber of generally the same magnitude of that of the wheel on the outer side of the turn is applied to the rear wheel 3 on the inner side of the turn.

Thus, according to the present embodiment, at the time of the actuator 10 pushing or pulling the knuckles 4 to adjust the camber angle and toe angle of the rear wheels 3, the knuckles 4 turn on the link portions 11 and 12 relative to the trailing arms 5, and the knuckles 4 can be turned in a direction to change the camber angle and toe angle of the rear wheels 3 since the turning axis defined by the link portions 11 and 12 is arranged tilted with respect to the longitudinal direction of the vehicle. Also, since turning of the knuckles 4 is permitted by the link portions 11 and 12, twisting does not occur at the trailing arms 5, thereby preventing excessive displacement from occurring at the rubber bushing of the link portion 16 linking the trailing arms 5 to the body. Accordingly desired suspension properties can be realized even if the link portion 16 has great supporting rigidity.

Also, the present embodiment can be realized by adding a configuration to link the knuckles 4 and trailing arms 5 by the two link portions 11 and 12 in an existing suspension device with no changes to the basic configuration, and there is no need to add members such as arms and links to an existing suspension device. Accordingly, increase in cost can be suppressed.

Also, the present embodiment enables the camber angle and toe angle to be adjusted at the same time with a single actuator 10. If the actuator 10 is driven to push the knuckles 4 in the opposite direction with the same stroke amount, the absolute value of toe angle at the toe-out side is smaller than the absolute value of toe angle at the toe-in side. Accordingly, when performing inverse phase toe angle control where the rear wheels 3 are given toe angle of the opposite phase to the steering angle of the front wheels 31, the substantive toe angle becomes small when turning at high speeds and the substantive toe angle becomes great when turning at low speeds, even without performing control to change the toe angle based on the vehicle speed. Accordingly, steering properties during low-speed turning can be improved, and drivability can be improved, while preventing deterioration in stability during high-speed turning. Also, if the actuator 10 is driven to push the knuckles 4 in the opposite direction with the same stroke amount, the absolute values of toe angles differ between the toe-out side and toe-in side, but the absolute values of camber angle can be made to be generally the same. Accordingly, camber angle with generally the same absolute values can be applied to the left and right rear wheels when performing inverse phase toe angle control, so running resistance when turning can be reduced in a well-balanced manner between the left and right sides.

Figure 12A:
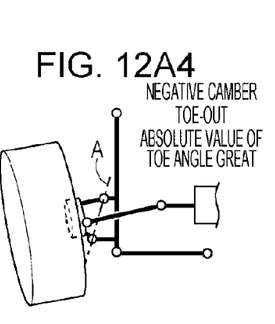
Figure 12A:
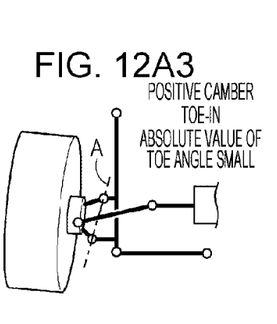
Figure 12A:
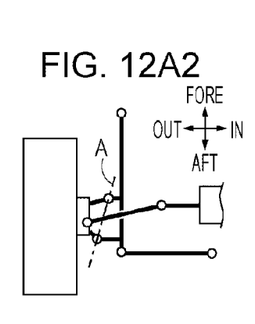
Figure 12A:
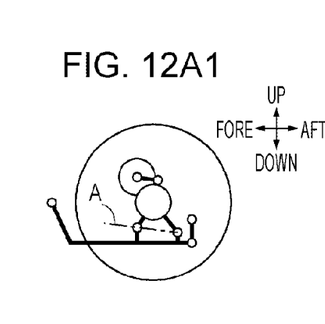
Figure 12B:
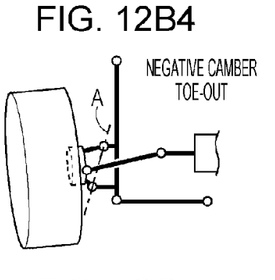
Figure 12B:
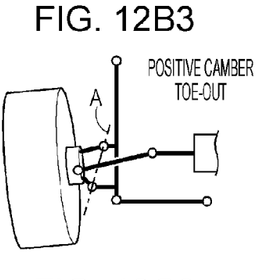
Figure 12B:
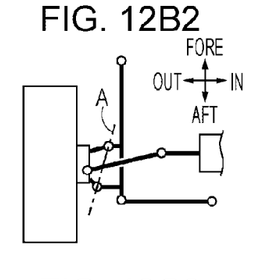
Figure 12B:
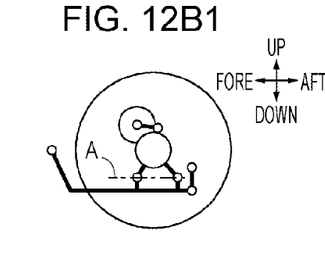
Figure 12C:
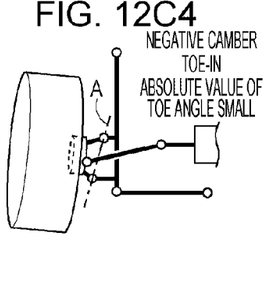
Figure 12C:
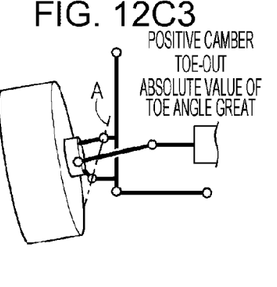
Figure 12C:
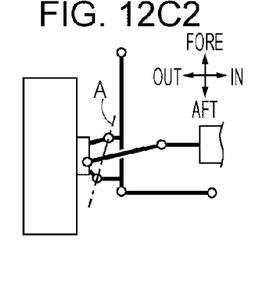
Figure 12C:
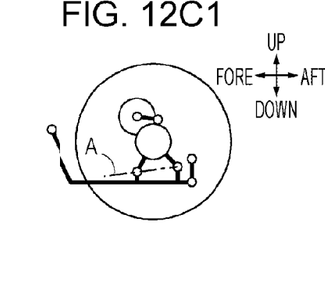

Next, modifications of the turning axis A on which the knuckle 4 turns with respect to the trailing arm 5 will be described. FIGS. 10A1 through 12C4 are schematic side views and plan views illustrating the camber angle and toe angle of the rear wheel 3 in modifications where the turning axis A has been set variously.

FIGS. 10A1 through 10C4 illustrate a case where the side of the turning axis A toward the front of the vehicle has been tilted towards the outside of the vehicle relative to the longitudinal direction in plan view, FIGS. 11A1 through 11C4 illustrate a case where the turning axis A is parallel to the vehicle in the longitudinal direction in plan view, and FIGS. 12A1 through 12C4 illustrate a case where the side of the turning axis A toward the front of the vehicle has been tilted towards the inside of the vehicle relative to the longitudinal direction in plan view.

Also, FIGS. 10A1 through 10A4, 11A1 through 11A4, and 12A1 through 12A4 illustrate a case where the side of the turning axis A toward the front in the longitudinal direction of the vehicle in side view has been tilted upwards, FIGS. 10B1 through 10B4, 11B1 through 11B4, and 12B1 through 12B4 illustrate a case where the turning axis A is parallel to the vehicle in the longitudinal direction in side view, and FIGS. 10C1 through 10C4, 11C1 through 11C4, and 12C1 through 12C4 illustrate a case where the side of the turning axis A toward the front in the longitudinal direction of the vehicle in side view has been tilted downwards.

FIGS. 10A1, 10B1, 10C1, 11A1, 11B1, 11C1, 12A1, 12B1, and 12C1 are side views. FIGS. 10A2, 10B2, 10C2, 11A2, 11B2, 11C2, 12A2, 12B2, and 12C2 are plan views. FIGS. 10A3, 10B3, 10C3, 11A3, 11B3, 11C3, 12A3, 12B3, and 12C3 are plan views illustrating the actuator 10 pushing. FIGS. 10A4, 10B4, 10C4, 11A4, 11B4, 11C4, 12A4, 12B4, and 12C4 are plan views illustrating the actuator 10 pulling.

FIGS. 10A1 through 12C4 also indicate the magnitude of absolute values of toe angle when pushing and pulling, under conditions that the amount of stroke of the actuator 10 is the same when pushing and pulling, and that the magnitude of absolute values of toe angle when pushing and pulling differ.

Figure 10A:
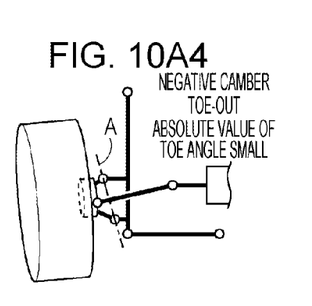
Figure 10A:
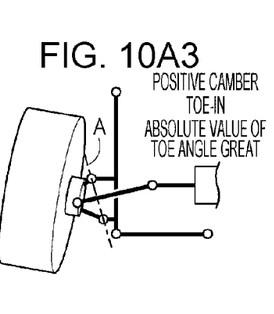
Figure 10A:
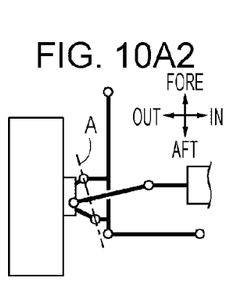
Figure 10A:
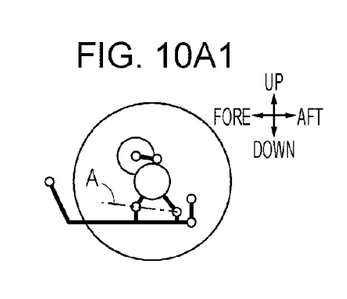
Figure 10B:
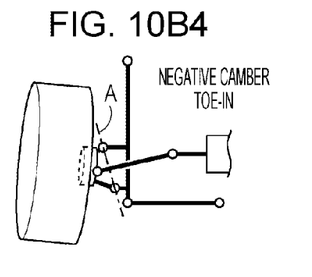
Figure 10B:
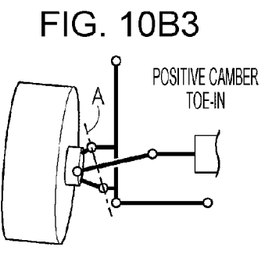
Figure 10B:
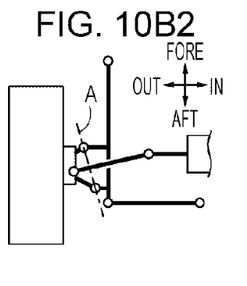
Figure 10B:
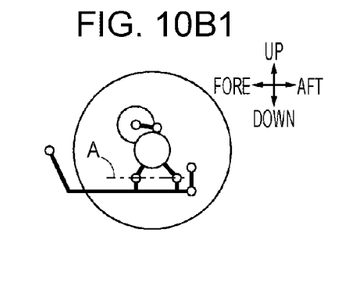
Figure 10C:
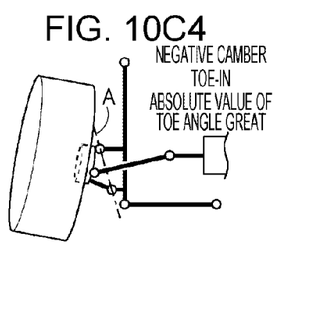
Figure 10C:
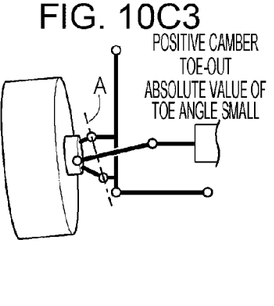
Figure 10C:
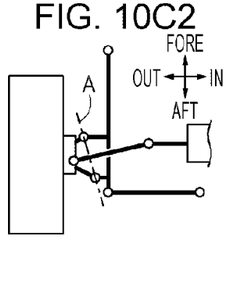
Figure 10C:
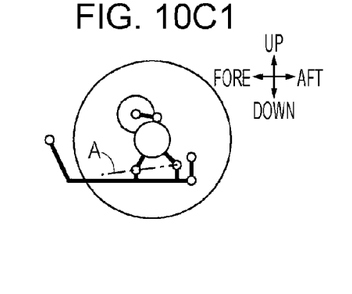
Figure 11A:
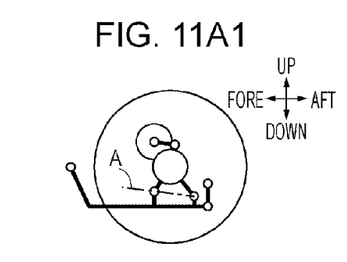
Figure 11A:
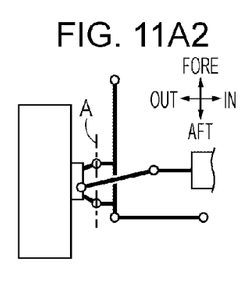
Figure 11A:
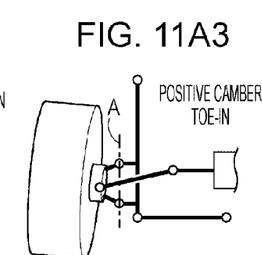
Figure 11A:
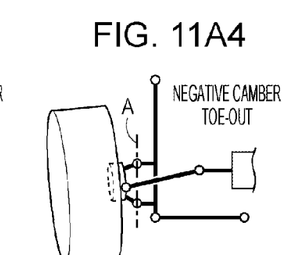
Figure 11B:
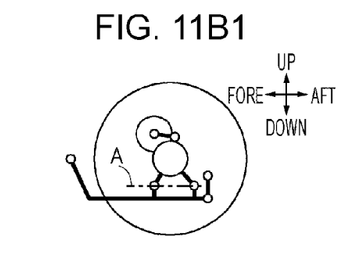
Figure 11B:
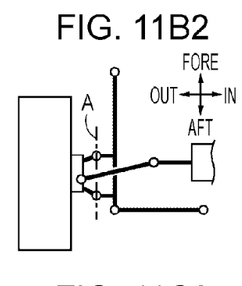
Figure 11B:
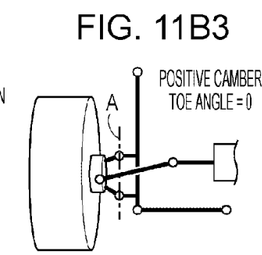
Figure 11B:
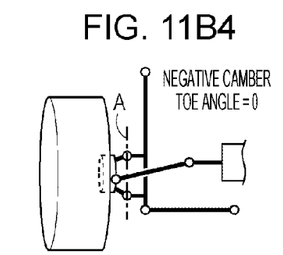
Figure 11C:
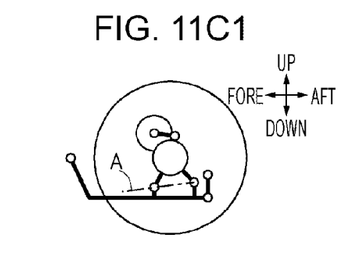
Figure 11C:
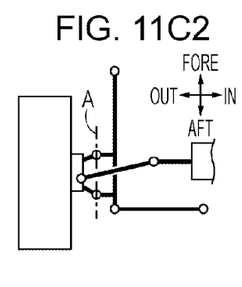
Figure 11C:
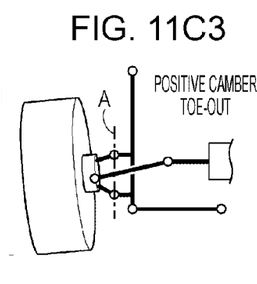
Figure 11C:
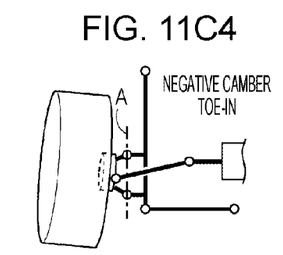

Now, in order to realize a state necessary for inverse phase toe angle control during turning of the vehicle, i.e., in order to make the absolute value of toe angle for toe-out to be smaller than the absolute value of toe angle for toe-in, the side of the turning axis A toward the front in the longitudinal direction of the vehicle (front portion of the Axis A) in plan view has to be tilted outwards, and the side toward the front in the longitudinal direction (front portion of the Axis A) of the vehicle in side view has to be tilted upwards, as illustrated in FIGS. 10A1 through 10A4 and 10C1 through 10C4. Particularly, in order to realize negative camber for toe-out and positive camber for toe-in, the side of the turning axis A toward the front in the longitudinal direction of the vehicle (front portion of the Axis A) in side view has to be tilted upwards, as illustrated in FIGS. 10A1 through 10A4 according to the present embodiment.

In order to enable the toe angle to change in the toe-in direction and toe-out direction, the side of the turning axis A toward the front in the longitudinal direction of the vehicle in side view has to be set tilted upwards, thus if the turning axis A is set parallel to the vehicle in the longitudinal direction in side view, the toe angle cannot change in the toe-in direction and toe-out direction. Specifically, in the case of FIGS. 10B1 through 10B4, the toe angle cannot be changed to the toe-out direction, in the case of FIGS. 11B1 through 11B4, the toe angle remains at zero, and in the case of FIGS. 12B1 through 12B4, the toe angle cannot be changed to the toe-in direction.

While the present disclosure has been described by way of specific embodiments, these embodiments are only exemplary, and the present disclosure is not restricted to these embodiments. Not all of the components of the rear wheel suspension device according to the present disclosure described in the embodiments are necessarily required, and may be chosen as appropriate without departing from the scope of the present disclosure at the least.

For example, while FIG. 4 illustrates the left and right knuckles 4 being pushed and pulled using a single actuator 10, actuators may be provided separately to the left and right sides, so that the two actuators are symmetrically operated.

Also, the present embodiment has two link portions 11 and 12 linking the knuckle 4 and trailing arm 5 as illustrated in FIG. 1, but an arrangement is made where only one link portion is provided.

Also, the present embodiment has been primarily described regarding the configuration illustrated in FIGS. 1 through 9B, which is based on the configuration of the turning axis A illustrated in FIGS. 10A1 through 10A4, but the present disclosure is not restricted to this configuration of the turning axis A. That is to say, the various configurations illustrated in FIGS. 10A1 through 12C4 may be employed in accordance with behavioral properties required of the rear wheels.

Also, while description has been made with the present embodiment regarding an example of a trailing-arm rear wheel suspension device, the present disclosure is not restricted to this, and may be applied to other types of rear wheel suspension devices.

We claim:

1. A rear wheel suspension device comprising:
a knuckle configured to support a rear wheel;
a suspension arm member configured to link the knuckle to a vehicle body;
a link member configured to link the knuckle to the suspension arm member; and
an actuator configured to push and pull the knuckle in a substantially width direction of the vehicle to adjust camber angle and toe angle of the rear wheel;
wherein the link member enables the knuckle to rotate in a direction of changing the camber angle and the toe angle;
and wherein a rotation axis of the knuckle defined by the link member is tilted with respect to a longitudinal direction of the vehicle such that a front portion of the rotation axis in the longitudinal direction of the vehicle is tilted outward in plan view, and is tilted up or down in side view.

2. The rear wheel suspension device according to claim 1, wherein the rotation axis of the knuckle is tilted with respect to the longitudinal direction of the vehicle such that the front portion of the rotation axis is tilted up in side view.

3. The rear wheel suspension device according to claim 1, wherein the knuckle includes a right knuckle supporting a right rear wheel and a left knuckle supporting a left rear wheel,
wherein the actuator includes a right output shaft and a left output shaft, each pushing and pulling corresponding one of the right knuckle and the left knuckle.

4. The rear wheel suspension device according to claim 3, wherein the actuator moves the right output shaft and the left output shaft in the substantially width direction of the vehicle with the same stroke amount.

5. The rear wheel suspension device according to claim 1, wherein the suspension arm member includes a trailing arm, an upper arm, and a lower arm, and
wherein the knuckle is linked to the trailing arm via the link member defining the rotation axis.

6. The rear wheel suspension device according to claim 5, wherein the knuckle is linked to the trailing arm via the link member at a position under an axle of the rear wheel, and the knuckle is linked to the upper arm at a position above the axle of the rear wheel, the upper arm being connected to the actuator.

7. A vehicle comprising the rear wheel suspension device according to claim 1.

* * * * *